(12) United States Patent
Glaser et al.

(10) Patent No.: US 8,556,348 B2
(45) Date of Patent: Oct. 15, 2013

(54) FOLDING VEHICLE SEAT

(75) Inventors: Rainer A. Glaser, Washington, MI (US); Krzysztof Wroblewski, Washington, MI (US); Stanislaw A. Wieclawski, Hohenkammer (DE)

(73) Assignee: GM Global Technology Operations LLC, Detroit, MI (US)

( * ) Notice: Subject to any disclaimer, the term of this patent is extended or adjusted under 35 U.S.C. 154(b) by 161 days.

(21) Appl. No.: 13/289,059

(22) Filed: Nov. 4, 2011

(65) Prior Publication Data

US 2013/0113255 A1 May 9, 2013

(51) Int. Cl.
*B60N 2/02* (2006.01)
(52) U.S. Cl.
USPC ............ 297/341; 297/378.12; 296/65.09; 296/65.13
(58) Field of Classification Search
USPC ............ 297/341, 378.1, 378.12, 378.14; 296/65.05, 65.09, 65.13, 65.14
See application file for complete search history.

(56) References Cited

U.S. PATENT DOCUMENTS

| 4,699,418 | A | * | 10/1987 | Plavetich | 296/65.09 |
| 6,059,345 | A | * | 5/2000 | Yokota | 296/65.14 |
| 6,155,626 | A | * | 12/2000 | Chabanne et al. | 296/65.03 |
| 6,578,919 | B2 | * | 6/2003 | Seibold et al. | 297/331 |

* cited by examiner

*Primary Examiner* — Sarah B McPartlin
(74) *Attorney, Agent, or Firm* — Quinn Law Group, PLLC

(57) ABSTRACT

A seat assembly includes a track mount configured to shift along a track and a platform configured to selectively latch to, unlatch from, and pivot relative to the track mount. The assembly also includes a seat-back and a seat-cushion, each connected to the platform and configured to selectively latch to, unlatch from, and pivot relative to the platform. The assembly additionally includes a first mechanism configured to selectively operate the seat assembly in a first mode and a second mode. The first mode includes unlatching and pivoting the seat-back and unlatching and pivoting the platform such that the seat assembly tumbles relative to the track. The second mode includes unlatching and pivoting the seat-cushion and unlatching and pivoting the seat-back such that the seat-back comes to rest substantially parallel to the track mount. A vehicle having the seat assembly is also provided.

20 Claims, 4 Drawing Sheets

FOLDING VEHICLE SEAT

TECHNICAL FIELD

The invention relates to a folding seat for a vehicle.

BACKGROUND

Vehicles are typically provided with seats designed to accommodate the operator and passenger(s) of the vehicle. Frequently, such seats are configured to shift inside the vehicle as well as recline in order to enhance passenger comfort and be moved out of the way to generate useful space for transporting cargo.

Some vehicle seats employ mechanisms that permit the seats to fold and/or be removed from the subject vehicle to further improve the versatility of the subject vehicle. Frequently, expansion of the stowage and cargo carrying capability of a vehicle is selected at the expense of the vehicle's seating capacity and vice versa.

Additionally, most vehicle seats work together with seatbelts configured to restrain the vehicle's operator and passengers. Some seats incorporate seatbelts into the seat structures in order to exclude the effects of vehicle build tolerances on the positioning of the seatbelt mounting points with respect to the seat occupant.

SUMMARY

A seat assembly for mounting on a track includes a track mount configured to shift along the track and a platform configured to selectively latch to, unlatch from, and pivot relative to the track mount. The seat assembly also has a seat-back pivotably connected to the platform and configured to selectively latch to the platform in a first seat-back position, unlatch from the platform, and pivot to a second seat-back position. The seat assembly additionally includes a seat-cushion pivotably connected to the platform and configured to selectively latch to the platform in a first seat-cushion position, unlatch, and pivot to a second seat-cushion position.

The seat assembly additionally includes a first mechanism configured to selectively operate the seat assembly in a first mode and a second mode. In the first seat-back position the seat-back stands free of the seat-cushion and in the second seat-back position the seat-back rests against the seat-cushion. In the first seat-cushion position a height of the seat-cushion is greater relative to the platform as compared to the second seat-cushion position. The first mode includes unlatching and pivoting the seat-back from the first seat-back position to the second seat-back position, and unlatching and pivoting the platform relative to the track mount such that the seat assembly tumbles relative to the track. The second mode includes unlatching and pivoting the seat-cushion from the first seat-cushion position to the second seat-cushion position, and unlatching and pivoting the seat-back from the first seat-back position to the second seat-back position. In the second mode the seat-back comes to rest substantially parallel to the track mount.

The seat assembly may also include a first release device configured to unlatch the platform from the track mount and a second release device configured to unlatch the seat-back from the platform.

The seat assembly may additionally include a second mechanism configured to return the seat-cushion to the first seat-cushion position after the seat-back is returned to the first seat-back position following operation in the first mode. In such a case, the second mechanism may include a pre-loaded cable spool configured to pull the seat-cushion to the first seat-cushion position. Furthermore, the second mechanism may be configured to latch the seat-cushion to the platform in the first seat-cushion position prior to latching the seat-back in the first seat-back position.

The first mechanism may include a device configured to provide an assist force for pivoting the platform relative to the track mount in the first mode. The first mechanism may also include a damper configured to control the assist force provided by the device.

The first mechanism may include at least one pull cable configured to unlatch the platform from the track mount and at least one pull cable configured to unlatch the seat-cushion from the platform.

The seat assembly may also include a first spring member and a second spring member. In such a case, the pivoting of the seat-back to the second seat-back position may be urged by the first spring member and the pivoting of the seat-cushion to the second seat-cushion position may be urged by the second spring member.

A vehicle having a track fixed to the vehicle structure and the disclosed seat assembly mounted on the track is also provided.

The above features and advantages and other features and advantages of the present invention are readily apparent from the following detailed description of the best modes for carrying out the invention when taken in connection with the accompanying drawings.

DETAILED DESCRIPTION

Figure 1:
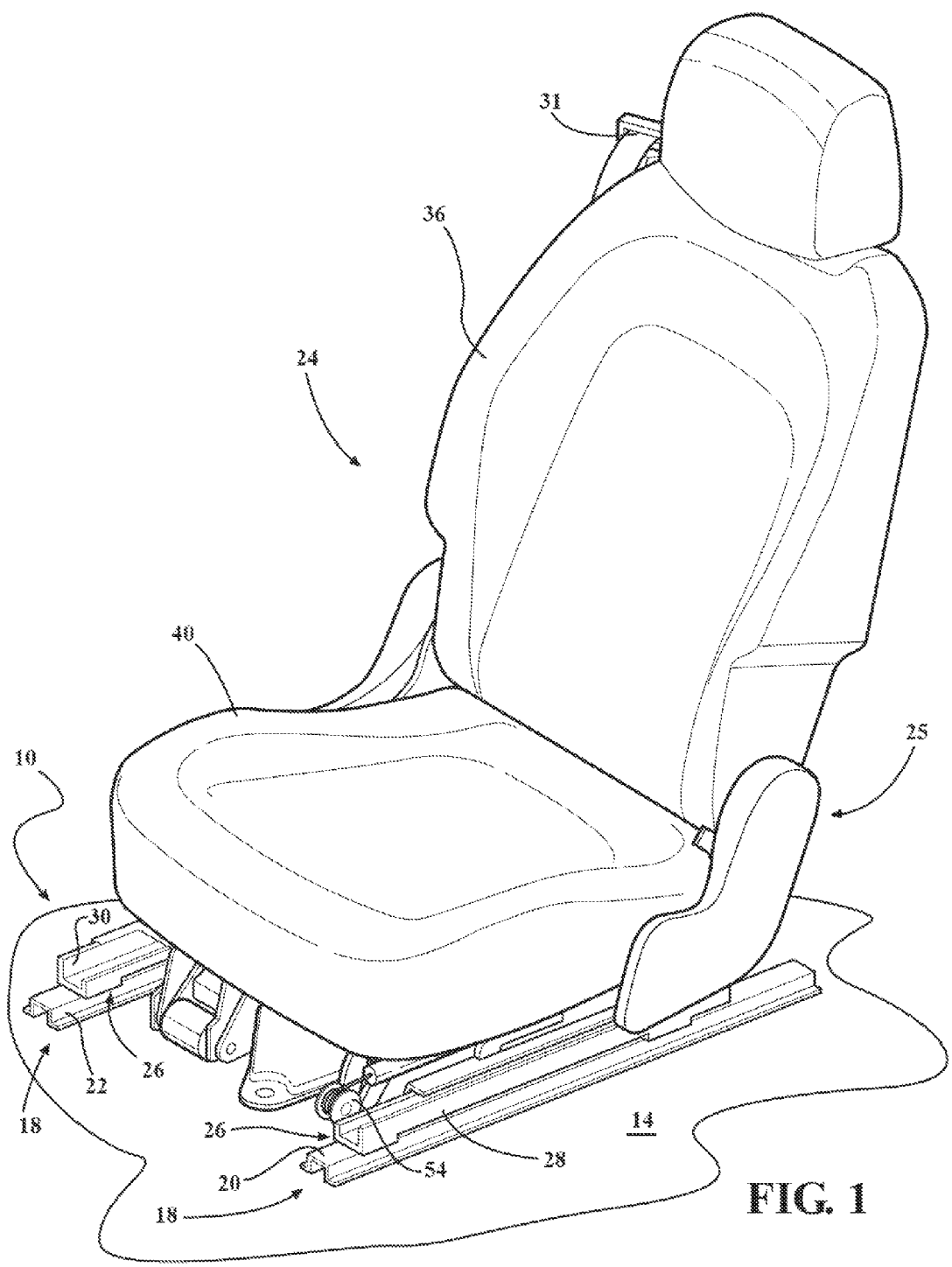
FIG. 1 is a perspective view of a folding seat assembly mounted in a vehicle.

Referring to the drawings, wherein like reference numbers refer to like components, FIG. 1 shows a perspective view of a vehicle 10 including a vehicle structure 14 such as a body which forms a passenger compartment. A track 18 is fixed to the vehicle structure 14 inside the passenger compartment. The track 18 includes a first track runner 20 and a second track runner 22, wherein the first and second runners are spaced apart and are arranged parallel to one another.

Figure 2:
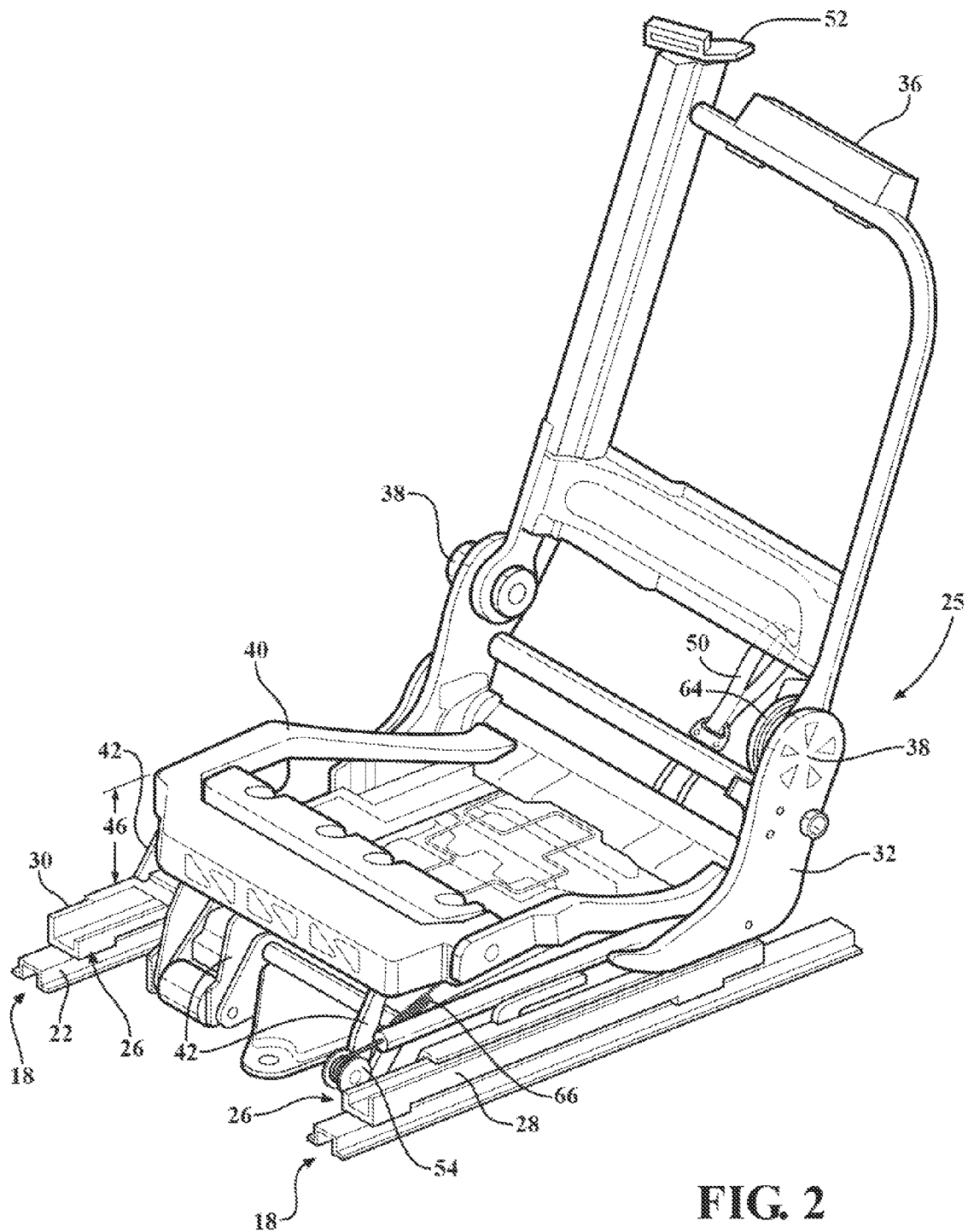
FIG. 2 is a perspective view of the seat assembly shown in FIG. 1 but with external covering, padding, and springs removed.

As shown in FIGS. 1 and 2, the vehicle 10 includes a seat assembly 24 installed inside the passenger compartment. The seat assembly 24 includes a first mechanism 25 configured to selectively operate the seat assembly in a first mode shown in FIG. 3 and a second mode shown in FIG. 4, that will each be described in detail below. As employed herein, the term "mode" refers to an operating sequence for selecting a desired position of the seat assembly 24. While FIG. 1 depicts the seat assembly 24 in its completed state, as typically installed inside the passenger compartment of the vehicle 10, FIG. 2 depicts the framework of the seat assembly 24 with external covering, padding, and springs removed for ease of illustration of the seat assembly's first mechanism 25.

The seat assembly 24 includes a track mount 26. The track mount 26 is fixed to the seat assembly 24 and is mounted on the track 18. The track mount 26 includes a first track mount runner 28 and a second track mount runner 30. The first and second track mount runners 28, 30 are arranged parallel to one another and are spaced apart such that the first track mount runner 28 engages the first track runner 20 and the second track mount runner 30 engages the second track runner 22. As a result, the track mount 26 is configured to shift or slide along the track 18. The seat assembly 24 may additionally include a controlling mechanism (not shown) configured to permit fore-aft adjustment and locking of the seat assembly in various positions along the track 18.

Figure 3:
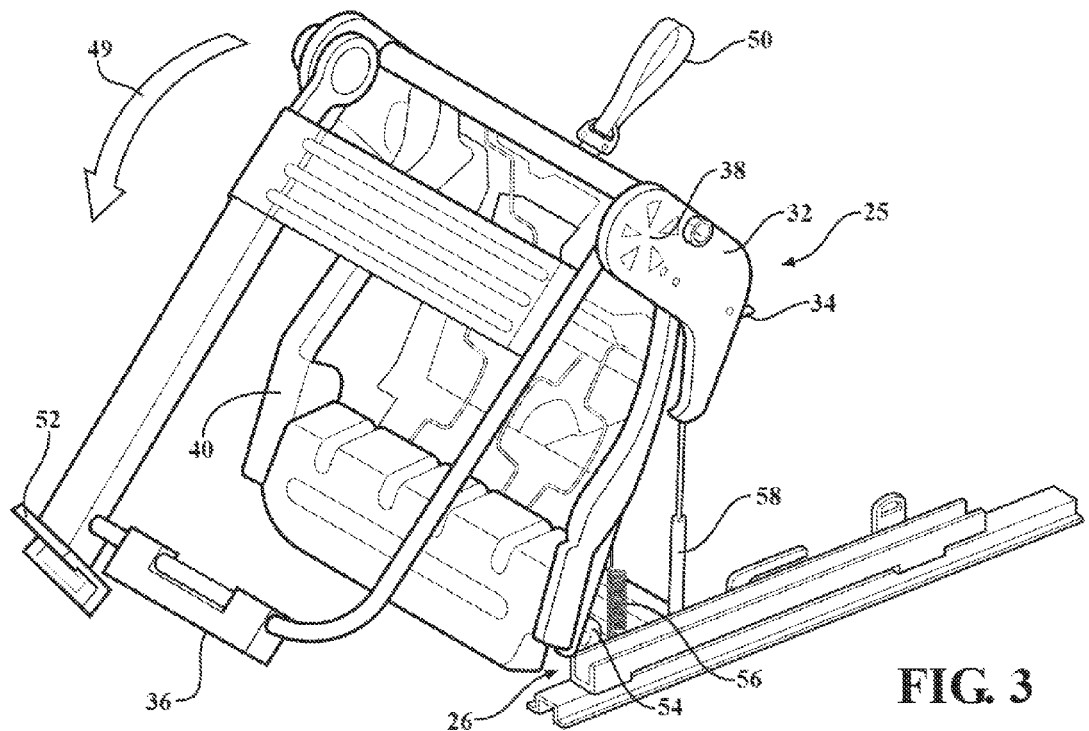
FIG. 3 is a perspective view of the seat assembly shown in FIG. 2, illustrating the seat assembly being folded in a first mode of operation.

As additionally shown in FIG. 1, the seat assembly 24 may also include a seat belt 31. As may be seen in FIG. 3, the seat assembly 24 also includes a platform 32 configured to selectively latch to, unlatch from, and pivot relative to the track mount 26 via a first set of latches 34. The platform 32 additionally operates as a substantially rigid base for supporting various hardware of the seat assembly 24, such as a retractor-pretensioner (not shown) for the seat belt 31, as well as the first mechanism 25 that will be described below. FIG. 3 shows one latch of the first set of latches 34 located on the side of the first track mount runner 28. As understood by those skilled in the art, another latch of the first set of latches 34, although obscured by the various hardware of the seat assembly 24, is located on the side of the second track mount runner 30.

The seat assembly 24 also includes a seat-back 36 pivotably connected to the platform 32 via a first set of hinges 38 that are part of the first mechanism 25. The first set of hinges 38 includes a release mechanism (not shown) configured to selectively lock and unlock the seat-back 36 and permit the seat-back to be fixed or pivot relative to the platform 32. The seat-back 36 is shown in FIG. 1 as being covered with appropriate fabric, while in FIG. 2 only the frame of the seat-back is shown. With continued reference to FIG. 2, the seat assembly 24 also includes a seat-cushion 40 pivotably connected to the platform 32 via a second set of hinges 42. The seat-cushion 40 is shown in FIG. 1 as being covered with appropriate fabric, while in FIG. 2 only the frame of the seat-cushion is shown. The first mechanism 25 also includes a second set of latches 44 that are configured to selectively lock the seat-cushion 40 to and unlock the seat-cushion from the platform 32. Accordingly, when the second set of latches 44 is unlocked from the platform 32, the seat-cushion 40 is permitted to pivot relative to the platform 32.

As shown in FIGS. 1 and 2, the first mechanism 25 is configured to selectively latch the seat-back 36 to the platform 32 in a first seat-back position, wherein the seat-back stands free of and does not rest on the seat-cushion 40. The first mechanism 25 is also configured to unlatch and pivot the seat-back 36 to a second seat-back position, wherein the seat-back rests against the seat-cushion 40, as separately shown in FIGS. 3 and 4. The actual attitude of the seat-back 36 relative to the platform 32 in the second seat-back position depends on whether the seat-cushion 40 is placed in a first seat-cushion position or a second seat-cushion position that will be described in detail below.

As shown in FIGS. 1 and 2, the seat-cushion 40 is pivotably connected to the platform 32, while the first mechanism 25 is configured to latch the seat-cushion to the platform in a first seat-cushion position via the second set of latches 44. In the first seat-cushion position the seat-cushion 40 is pivoted on the second set of hinges 42 such that the seat-cushion is located proximate to the seat-back 36 and at a first height 46 relative to the platform 32. The first height 46 of the seat-cushion 40 provides an "operator-seating" position for the seat assembly 24, as shown in FIG. 2. Accordingly, the first seat-cushion position is configured to accommodate an occupant of the vehicle 10 in an appropriate relationship relative to the passenger compartment 14 when the vehicle is in motion.

The first mechanism 25 is also configured to unlatch the seat-cushion 40 from the platform from the first seat-cushion position via the second set of latches 44. When the second set of latches 44 is unlatched, the seat-cushion 40 is permitted to pivot relative to the platform 32 away from the seat-back 36 into the second seat-cushion position. In the second seat-cushion position the seat-cushion 40 is located distant from the seat-back 36 and at a second, reduced height 48 relative to the platform 32. Accordingly, in the first seat-cushion position the seat-cushion 40 is located farther from the platform 32 as compared to the second seat-cushion position, i.e., the first height 46 is greater than the second height 48. Furthermore, the second height 48 of the seat-cushion 40 permits the seat-back 36 to fold substantially flat relative to the track mount 26 when the first set of hinges 38 are unlocked via their attendant release mechanism.

Figure 4:
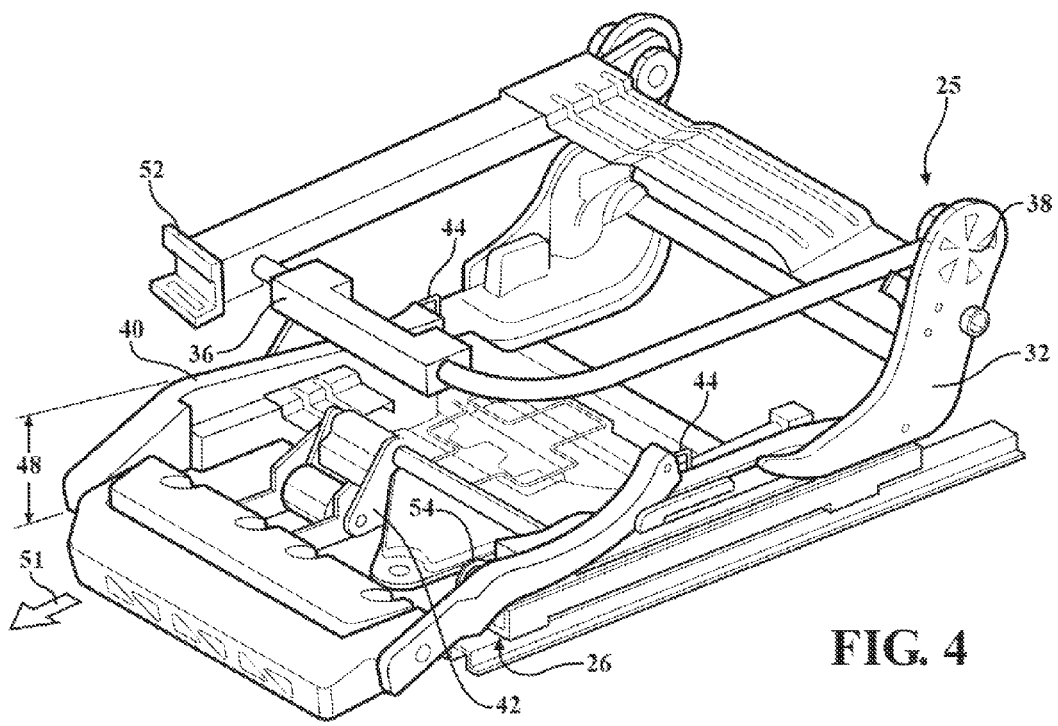
FIG. 4 is a perspective view of the seat assembly shown in FIG. 2, illustrating the seat assembly being folded in a second mode of operation.

As noted above, the first mechanism 25 is configured to selectively operate the seat assembly 24 in the first mode, as shown in FIG. 3, and in the second mode, as shown in FIG. 4. As shown in FIG. 3, the first mode includes unlatching and pivoting the seat-back 36 from the first seat-back position to the second seat-back position. The first mode additionally includes unlatching and pivoting the platform 32 relative to the track mount 26 such that the seat assembly 24 tumbles relative to the track 18, i.e., rolls and falls over about the hinge 42 in the direction of arrow 49. To permit the seat assembly 24 to be operated in the first mode, the first mechanism 25 additionally includes a first release device 50, such as a pull strap or a lever (shown in FIGS. 2-3 and 5). The first release device 50 is operatively connected to the platform 32 and configured to release the first set of latches 34 to thereby unlatch the platform from the track mount 26. Although the first release device 50 is shown as being connected to the platform 32, the first release device may also be arranged in any other location on the seat assembly 24 to provide enhanced convenience consistent with the packaging of a particular passenger compartment.

As shown in FIG. 4, the second mode includes unlatching and pivoting the seat-cushion 40 from the first seat-cushion position to the second seat-cushion position. In the second mode, the cushion 40 falls forward relative to the platform 32 about the hinge 42 in the direction of arrow 51. The second mode additionally includes unlatching and pivoting the seat-back 36 from the first seat-back position to the second seat-back position such that the seat-back comes to rest against the seat-cushion 40 substantially parallel to the track mount 26. To permit the seat assembly 24 to be operated in the second mode, the first mechanism 25 additionally includes a second release device 52, such as a pull strap or a lever (shown in FIGS. 2-4).

As shown in FIGS. 2-4, the second release device 52 is mounted to the top of seat-back 36 for operator convenience and configured to release the second set of latches 44 and the first set of hinges 38 via their attendant release mechanism. Accordingly, the second release device 52 operates to unlatch the seat-back 36 and unlock the seat-cushion 40 from the platform 32 and permits the seat-back and the seat-cushion to pivot relative to the platform 32, thus allowing the seat assembly 24 to fold substantially flat in the second mode. Although the second release device 52 is shown as being mounted to the top seat-back 36, the second release device may also be arranged in any other location on the seat assembly 24 to provide enhanced convenience consistent with the packaging of a particular passenger compartment.

As shown in FIG. 2, the seat assembly 24 also includes a second mechanism 54. The second mechanism 54 is configured to return the seat-cushion 40 to the first seat-cushion position after the seat-back 36 is returned to the first seat-back position following operation of the seat assembly 24 in the first mode. As shown, the second mechanism 54 may include a cable spool pre-loaded with a spring and configured to pull the seat-cushion 40 back to the first seat-cushion position. In order to assure that the seat assembly 24 has been fully returned to its "operator-seating" position, the second mechanism 54 is configured to latch the seat-cushion 40 to the platform 32 via the latch 34 in the first seat-cushion position prior to latching the seat-back 36 in the first seat-back position.

As shown in FIG. 3, the first mechanism 25 may include a device 56, such as an assist spring, configured to provide an assist force for pivoting the platform 32 relative to the track mount 26 in the first mode of operation. Additionally, as also shown in FIG. 3, the first mechanism 25 may include a damper 58, such as the type filled with a fluid. The damper 58 is configured to control the assist force provided by the device 56 and thereby dampen the tumble motion of the seat assembly 24 relative to the track 18.

Figure 5:
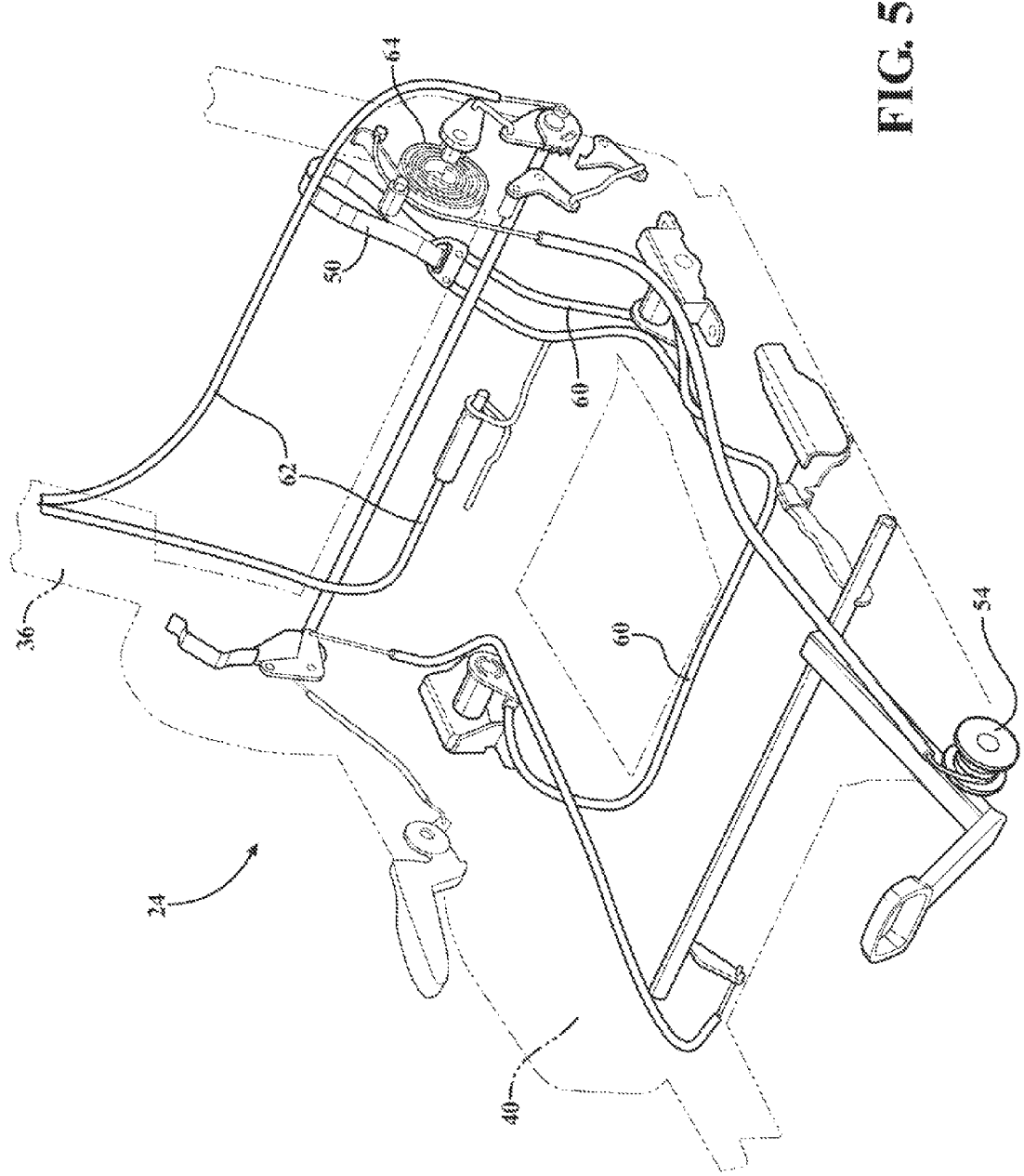
FIG. 5 is a perspective phantom view of the seat assembly shown in FIG. 2, illustrating internal mechanisms that assist in folding the seat assembly in the first and second modes of operation.

As shown in FIG. 5, the first mechanism 25 may include a set of pull cables 60 operatively connected between the first release device 50 and the first set of latches 34. Accordingly, the set of pull cables 60 operates to remotely unlatch the platform 32 from the track mount 26, thus facilitating the tumbling of the seat assembly 24 in the first mode. Furthermore, as also shown in FIG. 5, the first mechanism 25 may additionally include a set of pull cables 62 operatively connecting the second release device 52 to the first set of hinges 38 with their attendant release mechanism and to the second set of latches 44. Accordingly, the set of pull cables 62 operates to remotely unlatch the seat-back 36 and the seat-cushion 40 from the platform 32, thus facilitating operation of the seat assembly 24 in the second mode. As shown in FIGS. 2 and 5, the seat assembly 24 may also include a first spring member 64 configured to urge the pivoting of the seat-back 36 to the second seat-back position. Additionally, as shown in FIG. 2, the seat assembly 24 may include a second spring member 66 configured to urge the pivoting of the seat-cushion 40 to the second seat-cushion position.

The seat assembly 24 may be returned from its position in the first mode of operation by the seat-back 36 being pulled back to its substantially upright position. As the seat-back 36 is returned to its substantially upright position, the first set of hinges 38 become locked to the platform 32. Additionally, continued motion of the seat-back into its substantially upright position will also return the seat-cushion 40 to the "operator-seating" position and latch the first set of latches 34 to the platform 32. Furthermore, the seat assembly 24 may be returned from its position in the second mode of operation by the seat-back 36 being pulled back to its substantially upright position. As the seat-back 36 gets pulled back to its substantially upright position, the exemplary pre-loaded cable spool of the second mechanism 54 may rewind and pull the seat-cushion 40 from the second height 48 back into its "operator-seating" position at the first height 46. As noted above, the seat-cushion 40 is consistently latched in the first seat-cushion position to the platform 32 via the latch 34 prior to latching the seat-back 36 in the first seat-back position.

While the best modes for carrying out the invention have been described in detail, those familiar with the art to which this invention relates will recognize various alternative designs and embodiments for practicing the invention within the scope of the appended claims.

The invention claimed is:

1. A seat assembly for mounting on a track, the seat assembly comprising:
   a track mount configured to shift along the track;
   a platform configured to selectively latch to, unlatch from, and pivot relative to the track mount;
   a seat-back pivotably connected to the platform and configured to selectively latch to the platform in a first seat-back position, unlatch from the platform, and pivot to a second seat-back position;
   a seat-cushion pivotably connected to the platform and configured to selectively latch to the platform in a first seat-cushion position, unlatch from the platform, and pivot to a second seat-cushion position; and
   a first mechanism configured to selectively operate the seat assembly in a first mode and a second mode;
   wherein:
      in the first seat-back position the seat-back stands free of the seat-cushion and in the second seat-back position the seat-back rests against the seat-cushion;
      in the first seat-cushion position a height of the seat-cushion is greater relative to the platform as compared to the second seat-cushion position;
      the first mode includes unlatching and pivoting the seat-back from the first seat-back position to the second seat-back position, and unlatching and pivoting the platform relative to the track mount such that the seat assembly tumbles relative to the track; and
      the second mode includes unlatching and pivoting the seat-cushion from the first seat-cushion position to the second seat-cushion position, and unlatching and pivoting the seat-back from the first seat-back position to the second seat-back position such that the seat-back comes to rest substantially parallel to the track mount.

2. The seat assembly of claim 1, further comprising a first release device configured to unlatch the platform from the track mount.

3. The seat assembly of claim 2, further comprising a second release device configured to unlatch the seat-back from the platform.

4. The seat assembly of claim 1, further comprising a second mechanism configured to return the seat-cushion to the first seat-cushion position after the seat-back is returned to the first seat-back position following operation in the first mode.

5. The seat assembly of claim 4, wherein the second mechanism includes a pre-loaded cable spool configured to pull the seat-cushion to the first seat-cushion position.

6. The seat assembly of claim 4, wherein the second mechanism is configured to latch the seat-cushion to the platform in the first seat-cushion position prior to latching the seat-back in the first seat-back position.

7. The seat assembly of claim 1, wherein the first mechanism includes a device configured to provide an assist force for pivoting the platform relative to the track mount in the first mode.

8. The seat assembly of claim 7, wherein the first mechanism includes a damper configured to control the assist force provided by the device.

9. The seat assembly of claim 1, wherein the first mechanism includes at least one pull cable configured to unlatch the platform from the track mount and at least one pull cable configured to unlatch the seat-cushion from the platform.

10. The seat assembly of claim 1, further comprising a first spring member and a second spring member, wherein the pivoting of the seat-back to the second seat-back position is urged by the first spring member and the pivoting of the seat-cushion to the second seat-cushion position is urged by the second spring member.

11. A vehicle comprising:
a vehicle structure;
a track fixed to the vehicle structure; and
a seat assembly mounted on the track, the seat assembly including:
  a track mount configured to shift along the track;
  a platform configured to selectively latch to, unlatch from, and pivot relative to the track mount;
  a seat-back pivotably connected to the platform and configured to selectively latch to the platform in a first seat-back position, unlatch from the platform, and pivot to a second seat-back position;
  a seat-cushion pivotably connected to the platform and configured to selectively latch to the platform in a first seat-cushion position, unlatch from the platform, and pivot to a second seat-cushion position; and
  a first mechanism configured to selectively operate the seat assembly in a first mode and a second mode;
wherein:
  in the first seat-back position the seat-back stands free of the seat-cushion and in the second seat-back position the seat-back rests against the seat-cushion;
  in the first seat-cushion position a height of the seat-cushion is greater relative to the platform as compared to the second seat-cushion position;
  the first mode includes unlatching and pivoting the seat-back from the first seat-back position to the second seat-back position, and unlatching and pivoting the platform relative to the track mount such that the seat assembly tumbles relative to the track; and
  the second mode includes unlatching and pivoting the seat-cushion from the first seat-cushion position to the second seat-cushion position, and unlatching and pivoting the seat-back from the first seat-back position to the second seat-back position such that the seat-back comes to rest substantially parallel to the track mount.

12. The vehicle of claim 11, further comprising a first release device configured to unlatch the platform from the track mount.

13. The vehicle of claim 12, further comprising a second release device configured to unlatch the seat-back from the platform.

14. The vehicle of claim 11, further comprising a second mechanism configured to return the seat-cushion to the first seat-cushion position after the seat-back is returned to the first seat-back position following operation in the first mode.

15. The vehicle of claim 14, wherein the second mechanism includes a pre-loaded cable spool configured to pull the seat-cushion to the first seat-cushion position.

16. The vehicle of claim 14, wherein the second mechanism is configured to latch the seat-cushion to the platform in the first seat-cushion position prior to latching the seat-back in the first seat-back position.

17. The vehicle of claim 11, wherein the first mechanism includes a device configured to provide an assist force for pivoting the platform relative to the track mount in the first mode.

18. The vehicle of claim 17, wherein the first mechanism includes a damper configured to control the assist force provided by the device.

19. The vehicle of claim 11, wherein the first mechanism includes at least one pull cable configured to unlatch the platform from the track mount and at least one pull cable configured to unlatch the seat-cushion from the platform.

20. The vehicle of claim 11, further comprising a first spring member and a second spring member, wherein the pivoting of the seat-back to the second seat-back position is urged by the first spring member and the pivoting of the seat-cushion to the second seat-cushion position is urged by the second spring member.

* * * * *